(12) United States Patent
Zhou et al.

(10) Patent No.: US 12,392,327 B2
(45) Date of Patent: Aug. 19, 2025

(54) WIND TURBINE PLANET GEAR SHAFT AND PLANET GEAR STRUCTURE

(71) Applicant: SKF (China) Co Ltd, Shanghai (CN)

(72) Inventors: Jing Zhou, Shanghai (CN); Weihua Qian, Shanghai (CN); He Zhu, Shanghai (CN); Jinguang Zhu, Dalian (CN); Dapeng Li, Shanghai (CN); Jeffrey Wei, Kunshan (CN); Bo Shen, Jiangyin (CN); Zhi Yang, Xiangtan (CN); Zunyang Bai, Xiangtan (CN); Yuan Chen, Xiangtan (CN); Yabin Zhang, Xiangtan (CN); Xueliang Lu, Xiangtan (CN); Jie Zhu, Xiangtan (CN); Bi Luo, Xiangtan (CN); Shaohua Zhou, Xiangtan (CN)

(73) Assignees: SKF (China) Co Ltd, Shanghai (CN); Hunan SUND Technological Corporation, Xiangtan (CN)

( * ) Notice: Subject to any disclaimer, the term of this patent is extended or adjusted under 35 U.S.C. 154(b) by 0 days.

(21) Appl. No.: 18/659,310

(22) Filed: May 9, 2024

(65) Prior Publication Data

US 2024/0384707 A1  Nov. 21, 2024

(30) Foreign Application Priority Data

May 16, 2023  (CN) .......................... 202321182175.X

(51) Int. Cl.
*F03D 80/70* (2016.01)
*F03D 15/10* (2016.01)

(52) U.S. Cl.
CPC ......... *F03D 80/709* (2023.08); *F03D 15/101* (2023.08); *F03D 80/703* (2023.08); *F05B 2260/40311* (2013.01)

(58) Field of Classification Search
CPC ........ F02C 7/06; F16H 57/04; F05B 2260/40; F03D 80/709; F03D 80/703; F03D 15/101
See application file for complete search history.

(56) References Cited

U.S. PATENT DOCUMENTS 2,901,297 A * 8/1959 Sternlicht ............. F16C 17/028
384/291
6,056,509 A * 5/2000 Nakayama ........... B63H 21/386
416/174

(Continued)

FOREIGN PATENT DOCUMENTS

CN  104956076 B  9/2015
CN  110678648 B  1/2020

(Continued)

OTHER PUBLICATIONS

Extended European Search Report from the European Patent Office dated Oct. 28, 2024 in related EP application No. 24 174 974.6.

*Primary Examiner* — David E Sosnowski
*Assistant Examiner* — Theodore C Ribadeneyra
(74) *Attorney, Agent, or Firm* — J-TEK LAW PLLC; Scott T. Wakeman; Mark A. Ussai

(57) ABSTRACT

A wind turbine planet gear shaft has a shaft body with an outer surface, a segment of the outer surface being a slide bearing surface configured to form a radial slide bearing with an inner opening of a planet gear. The slide bearing surface has a first portion configured as a non-load-bearing zone and a second portion configured as a load-bearing zone and exactly one axially elongate oil pocket in the slide bearing surface, that oil pocket being located in the non-load-bearing zone. An oil supply channel in the shaft body has a first end in communication with the oil pocket, and first and second oil return channels in the slide bearing surface (Continued)

each have a first end at a longitudinal end of the oil pocket and a second end open to ambient air.

14 Claims, 9 Drawing Sheets

(56) References Cited

U.S. PATENT DOCUMENTS

| | | | | |
|---|---|---|---|---|
| 8,591,371 B2* | 11/2013 | Dinter | ............... | F16C 33/1055 |
| | | | | 475/160 |
| 9,410,572 B2* | 8/2016 | Shoup | ............... | F16C 33/1075 |
| 10,436,249 B2* | 10/2019 | Hoelzl | ............... | F16C 33/122 |
| 11,761,429 B2* | 9/2023 | Hager | ............... | F16C 33/1055 |
| | | | | 415/122.1 |
| 12,031,622 B2* | 7/2024 | Uhkötter | ............... | F02C 7/36 |
| 2011/0200422 A1* | 8/2011 | Gutknecht | ............... | F16C 17/26 |
| | | | | 415/1 |
| 2015/0361962 A1 | 12/2015 | Hager et al. | | |
| 2016/0146249 A1* | 5/2016 | Blair | ............... | F16C 17/028 |
| | | | | 464/7 |
| 2020/0158090 A1 | 5/2020 | Hager et al. | | |
| 2020/0347882 A1* | 11/2020 | Martin | ............... | F16H 57/043 |
| 2021/0010462 A1 | 1/2021 | Hoelzl et al. | | |
| 2023/0054748 A1* | 2/2023 | Martin | ............... | F16H 57/0479 |

FOREIGN PATENT DOCUMENTS

| | | |
|---|---|---|
| CN | 111936756 B | 11/2020 |
| CN | 214118768 U | 9/2021 |
| DE | 19902565 B4 | 7/2000 |
| EP | 3091242 A1 | 11/2016 |
| WO | 2023070670 A1 | 5/2023 |

* cited by examiner

WIND TURBINE PLANET GEAR SHAFT AND PLANET GEAR STRUCTURE

CROSS-REFERENCE

This application claims priority to Chinese patent application no. 202321182175.X filed on May 16, 2023, the contents of which are fully incorporated herein by reference.

TECHNOLOGICAL FIELD

The present disclosure is directed to the field of wind turbine planet gears, in particular to a wind turbine planet gear shaft and a wind turbine planet gear structure.

BACKGROUND

A wind turbine planet wheel is an important component of a wind turbine gearbox that includes a planet gear shaft, a planet gear, a radial sliding bearing, a thrust sliding bearing, bearing lubrication oil feed/return components, etc. The planet gear shaft is fixedly mounted on a planet carrier of the wind turbine gearbox, and the planet gear is meshed with an outer ring gear and a sun gear of the wind turbine gearbox. The radial sliding bearing supports the planet gear on the planet gear shaft, and a bearing lubrication and oil feed/return structure is disposed on the planet gear shaft and the radial sliding bearing and used to reduce wear between the planet gear shaft and the planet gear and also to carry away heat produced by friction.

However, an existing oil return component is generally disposed inside a shaft body, and oil which has increased in temperature must be discharged through an oil return channel inside the shaft body. However, this makes the oil return component structurally complex so processing thereof is complicated; moreover, the configuration of oil supply and oil return components in an existing wind turbine planet gear shaft alters the internal pressure distribution of the radial sliding bearing, and this greatly reduces the load-bearing ability of the radial sliding bearing, thus reducing the reliability of operation of the wind turbine planet gear structure.

SUMMARY

The technical problem to be solved by the present disclosure is to overcome the shortcomings of the prior art, by providing a wind turbine planet gear shaft and a wind turbine planetary gear structure which have good load-bearing ability, a simple oil return structure and a good cooling effect.

Accordingly, an embodiment of the present disclosure comprises a wind turbine planet gear shaft having a shaft body, a radial sliding bearing, an oil supply component for supplying oil to a surface of the radial sliding bearing, and an oil return component for carrying away heat of the radial sliding bearing. The oil supply component comprises an oil supply channel and a single oil pocket that are in communication with each other, and the single oil pocket is disposed on a surface of a non-load-bearing zone of the radial sliding bearing. The oil return component is located on a surface of the radial sliding bearing and comprises two oil discharge grooves respectively disposed at two sides in a length direction of the single oil pocket, the two ends of each oil discharge groove being in communication with the single oil pocket and external air, respectively.

In some embodiments, the oil supply channel comprises a radial main oil feed segment, an axial oil supply segment and a radial oil supply segment, which are sequentially in communication with each other. An oil feed end of the radial main oil feed segment is located at an outer surface at an end of the shaft body, the axial oil supply segment is located on a central axis of the shaft body, and the radial oil supply segment is in communication with the single oil pocket.

The oil supply channel further comprises a radial auxiliary oil feed segment, one end of the radial auxiliary oil feed segment being disposed on the surface of the non-load-bearing zone of the radial sliding bearing, and another end of the radial auxiliary oil feed segment being in communication with the axial oil supply segment.

The radial auxiliary oil feed segment is located at a central position in a length direction of the radial sliding bearing.

At least two of these radial auxiliary oil feed segments are provided and are arranged spaced apart in a circumferential direction of the shaft body.

A conical hole is provided at an oil feed end of the radial auxiliary oil feed segment.

One end of the axial oil supply segment is a sealed end disposed inside the shaft body, and another end is a threaded open end in communication with the outside. A threaded plug may be screwed into the threaded open end.

The radial sliding bearing is an alloy wear-resistant bearing, which is formed on an outer surface of the shaft body by laser cladding.

Also disclosed is a wind turbine planet gear structure, comprising a planet gear, a planet carrier, and a wind turbine planet gear shaft as described above, the planet gear being fitted round the wind turbine planet gear shaft, and the wind turbine planet gear shaft being fixedly mounted to the planet carrier.

In another aspect of the disclosure, the planet carrier is provided with an oil feed channel in communication with the oil supply channel. An end-to-end-connecting oil feed groove, configured to ensure an effective delivery of oil, is provided at an end of the oil supply channel that is in communication with the oil feed channel.

In a further aspect, a wind turbine planet gear shaft includes a shaft body having an outer surface, a segment of the shaft body outer surface comprising a slide bearing surface configured to form a radial slide bearing with an inner opening of a planet gear. The slide bearing surface has a first portion configured as a non-load-bearing zone and a second portion configured as a load-bearing zone. Exactly one axially elongate oil pocket is located in the slide bearing surface, and that oil pocket is located in the non-load-bearing zone. An oil supply channel in the shaft body has a first end in fluid communication with the oil pocket and a second end, and first and second oil return channels in the slide bearing surface each have first end at a longitudinal end of the oil pocket and a second end open to ambient air.

Compared with the prior art, the present disclosure has the following advantages:

(1) In the present disclosure, the oil pocket of the oil supply component is configured as a single oil pocket, which makes it better able to bear the load of the planet gear than an existing multiple oil pocket form. The single oil pocket is disposed on the surface of the non-load-bearing zone of the radial sliding bearing so that no single oil pocket is disposed in a load-bearing zone of the radial sliding bearing. The single oil pocket will not alter the internal pressure distribution of the radial sliding bearing and helps ensure that the bearing has maximum load-bearing ability. This increases the reliability and safety of operation of the wind turbine planet gear structure.

(2) Due to the large oil storage area of the single oil pocket, it has a certain degree of oil storage functionality, and there is no need to provide a separate oil storage space inside the shaft body. Therefore oil storage functionality is ensured, the structure is simple, and processing is convenient.

(3) In the present disclosure, since the oil return component is disposed on the surface of the radial sliding bearing, an oil return region is moved from inside the shaft body to an outer surface of the shaft body, thus avoiding problems such as structural complexity and complicated processing that are associated with an existing oil return component being disposed inside the shaft body. Moreover, the oil return component is provided with two oil discharge grooves, with the two ends of each oil discharge groove being in communication with the single oil pocket and external air, respectively, and consequently some of the heated oil in the single oil pocket can be discharged to an external space through the oil discharge groove. This helps to ensure effective cooling of the radial sliding bearing as well as effective reduction of wear between the planet gear shaft and the planet gear. Thus, while ensuring the cooling effect of the radial sliding bearing, the present disclosure further simplifies the structure of the oil return component and is convenient to process.

(4) The configuration of the oil discharge groove of the present disclosure increases the gap between the planet gear shaft and the planet gear such that impurities and particulates in the lubricating oil can be discharged through the oil discharge groove, thus avoiding the problem of being unable to discharge impurities due to a small gap between the planet gear shaft and the planet gear.

BRIEF DESCRIPTION OF THE DRAWINGS

A more detailed description of embodiments of the present invention based is given below, with reference to the drawings.

DETAILED DESCRIPTION

Figure 1:
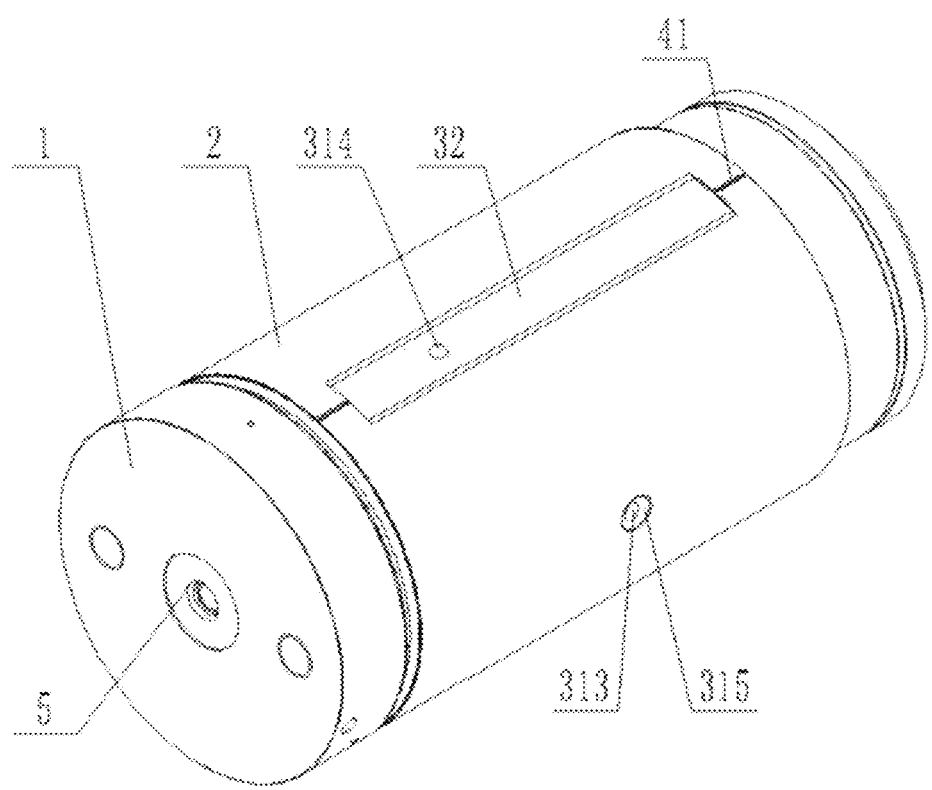
FIG. 1 is a schematic perspective view of a structure of a wind turbine planet gear shaft according to an embodiment of the present disclosure.

The present invention is explained in further detail below in conjunction with the accompanying drawings and specific embodiments, but without limiting the scope of protection of the present invention.

As shown in FIGS. 1-12, the wind turbine planet gear shaft in this embodiment comprises a shaft body 1, a radial sliding bearing 2, an oil supply component 3 and an oil return component 4. The radial sliding bearing 2 is disposed outside the shaft body 1 and is used to sustain the load of a planet gear 6. The oil supply component 3 comprises an oil supply channel 31 and a single oil pocket 32 which are in communication with each other. Oil enters the single oil pocket 32 through the oil supply channel 31 and provides lubrication for the radial sliding bearing 2. Compared with existing multiple oil pockets, the single oil pocket 32 has an increased load-bearing area, and is better able to bear the load of the planet gear 6.

Figure 3:
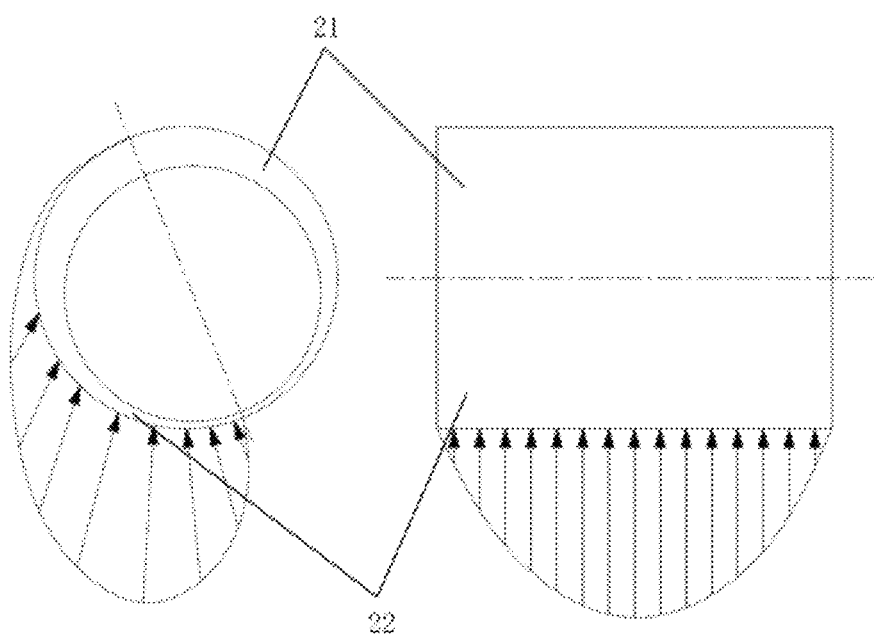
FIG. 3 is a schematic view illustrating a distribution of load-bearing forces of a wind turbine planet gear shaft according to the present disclosure.
Figure 4:
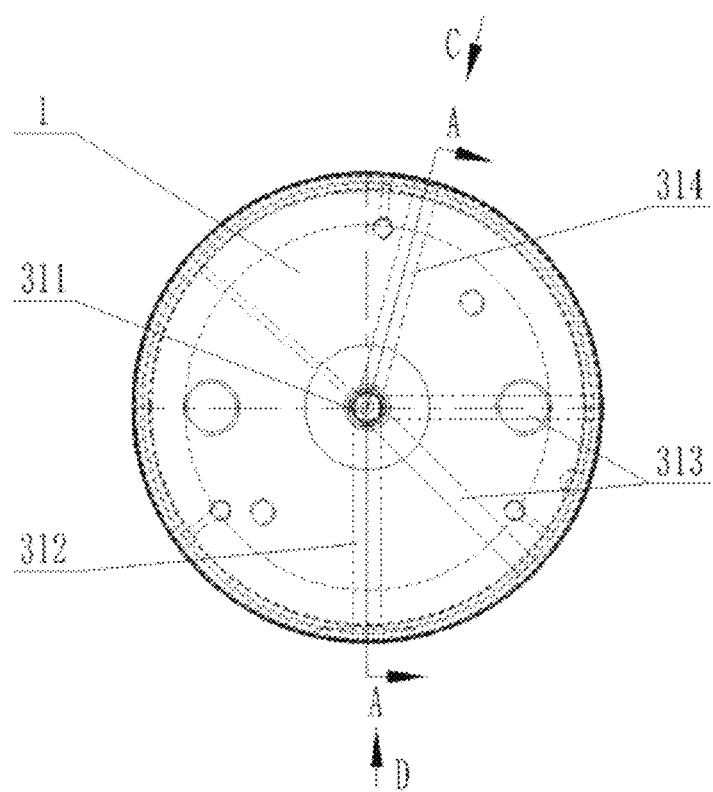
FIG. 4 is a left end elevational view of the wind turbine planet gear shaft of FIG. 1.

As shown in FIG. 3, when the planet gear 6 is running, due to the rotation of the planet gear 6 and the loading action of the outer ring gear and the sun gear on the planet gear 6, the radial sliding bearing 2 will form a pressure oil film, separating the planet gear 6 from the radial sliding bearing 2; at this time, a region where oil film pressure is formed is a load-bearing zone 22 of the radial sliding bearing 2, and a region where oil film pressure is not formed is a non-load-bearing zone 21 of the radial sliding bearing 2. In this embodiment, the single oil pocket 32 is disposed on a surface of the non-load-bearing zone 21 of the radial sliding bearing 2, so that no oil pocket is disposed in the load-bearing zone 22 of the radial sliding bearing 2; this will not alter the internal pressure distribution of the radial sliding bearing 2, further ensuring that the bearing has the maximum load-bearing ability, and thus ensuring the operational reliability and safety of the structure of the wind turbine planet gear 6. Moreover, due to the large oil storage area of the single oil pocket 32, it has a certain degree of oil storage functionality, and there is no need to provide a separate oil storage space inside the shaft body 1; thus, oil storage functionality is ensured, the structure is simple, and processing is convenient.

At the same time, the oil return component 4 is located on a surface of the radial sliding bearing 2. The oil return component 4 comprises two oil discharge grooves 41, the two oil discharge grooves 41 being respectively disposed at two sides in a length direction of the single oil pocket 32, one end of each oil discharge groove 41 being in communication with the single oil pocket 32 the other end of each oil discharge groove 41 being in communication with external air. In the present disclosure, since the oil return component 4 is disposed on the surface of the radial sliding bearing 2, an oil return region is moved from inside the shaft body 1 to an outer surface of the shaft body 1, thus avoiding problems such as structural complexity and complicated processing associated with an existing oil return component 4 being disposed inside the shaft body 1. Moreover, since the oil discharge groove 41 has separate ends in communication with the single oil pocket 32 and with external air, some of the heated oil in the single oil pocket 32 can be discharged to an external space through the oil discharge groove 41. This increases oil circulation, improves the heat-dissipating and cooling effect of the radial sliding bearing 2, and ensures effective reduction of wear between the wind turbine planet gear shaft and the planet gear 6. While ensuring the cooling effect of the radial sliding bearing 2, the present disclosure further simplifies the structure of the oil return component 4, and is convenient to process.

Secondly, the configuration of the oil discharge groove 41 increases the gap between the wind turbine planet gear shaft and the planet gear 6, such that impurities and particulates in the lubricating oil can be discharged through the oil discharge groove 41, thus avoiding the problem of being unable to discharge impurities due to too small of a gap between the wind turbine planet gear shaft and the planet gear 6.

In the present embodiment, circulating oil enters a bearing working face from the oil supply channel 31 and the single oil pocket 32, forming an oil film between the wind turbine planet gear shaft and the planet gear 6, thus preventing damage due to contact wear between the planet gear 6 and the radial sliding bearing 2; the circulating oil is discharged through the oil discharge groove 41 and two ends of the gap between the planet gear 6 and the radial sliding bearing 2, and impurities and particulates, etc. in the lubricating oil are discharged through the oil discharge groove 41.

Figure 2:
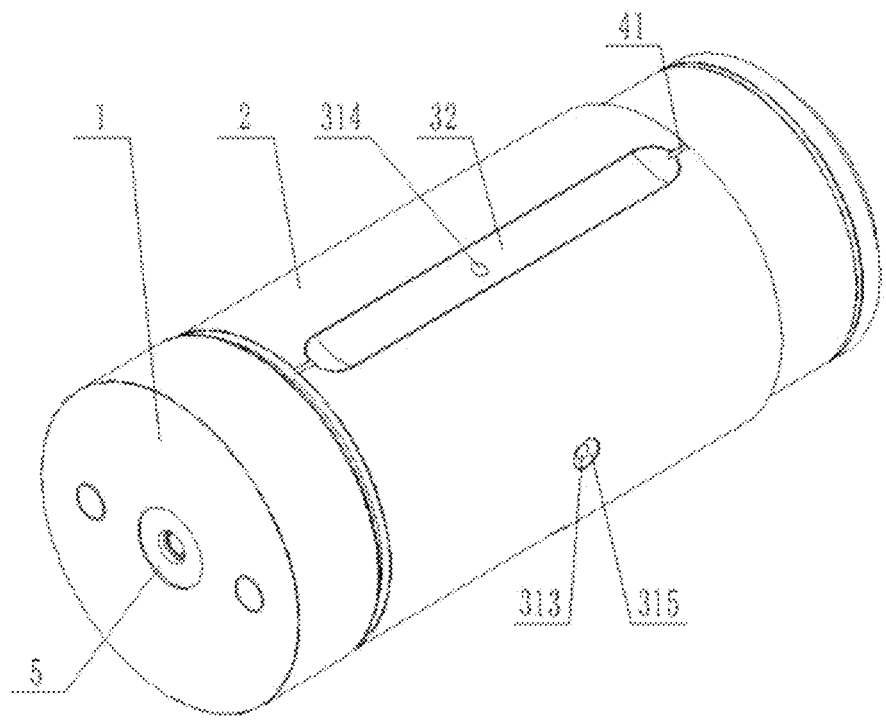
FIG. 2 is a schematic perspective view of a structure of a wind turbine planet gear shaft according to another embodiment of the present disclosure.
Figure 5:
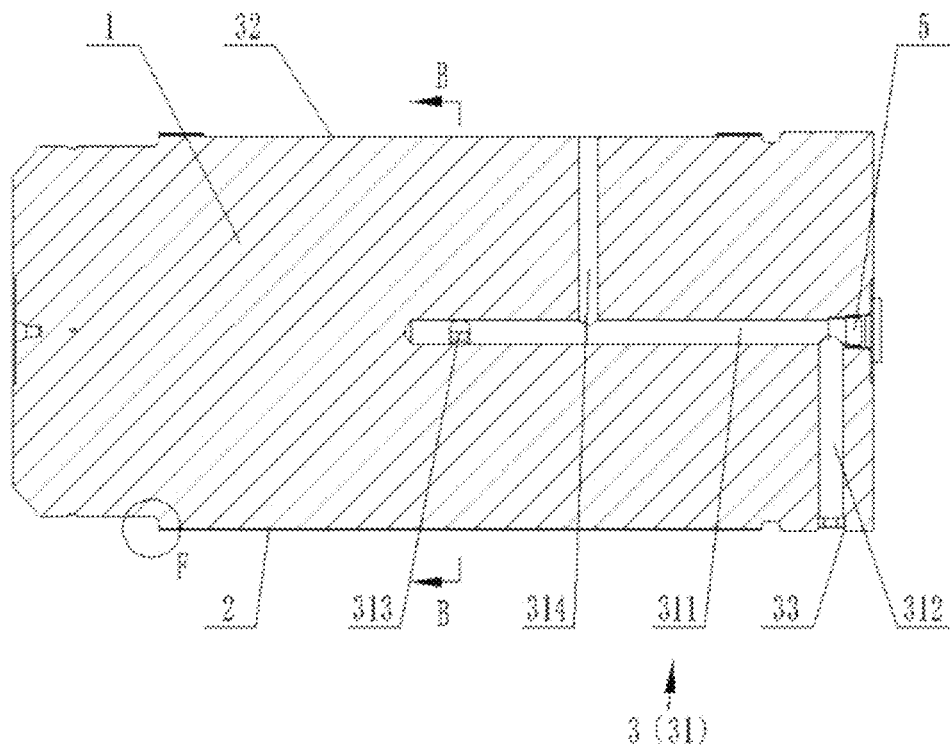
FIG. 5 is a sectional view along line A-A in FIG. 4.
Figure 7:
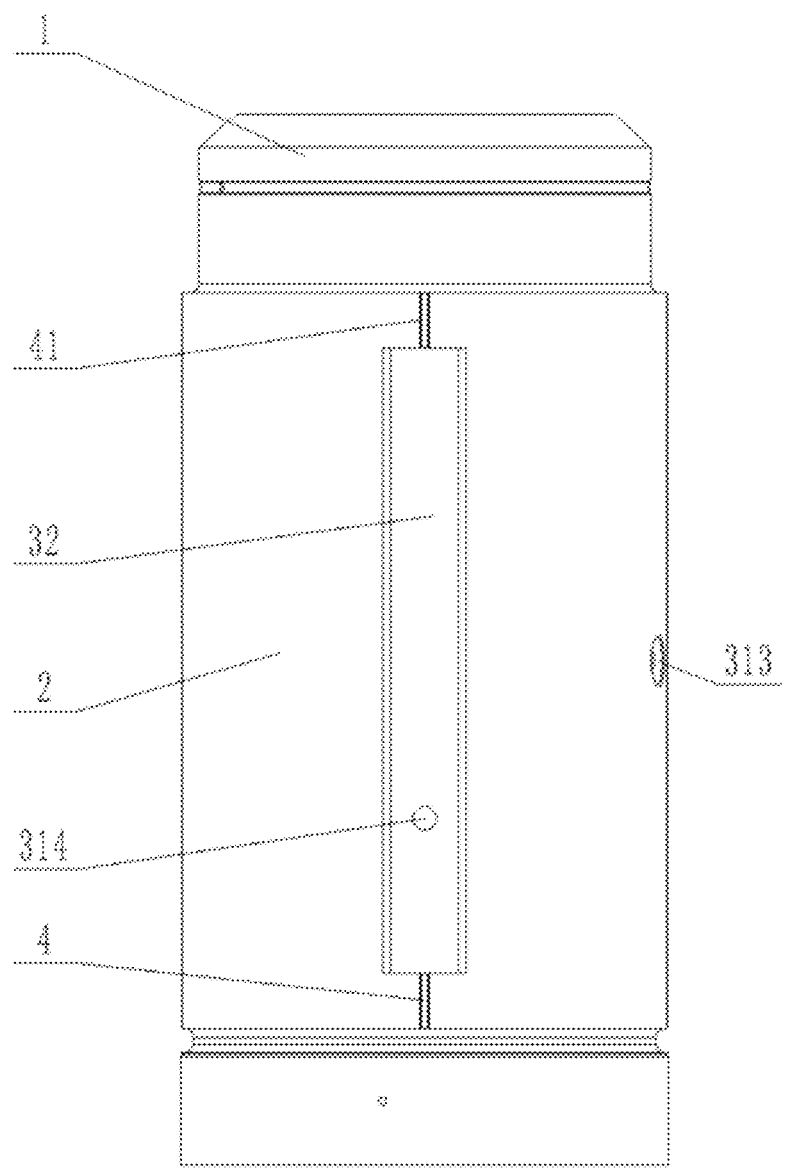
FIG. 7 is a elevation view of the wind turbine planet gear shaft of FIG. 4 looking in the direction of arrow C.
Figure 11:
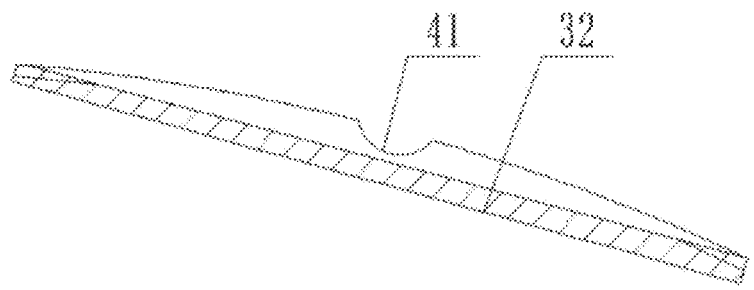
FIG. 11 is an enlarged detail view of region G in FIG. 6.
Figure 12:
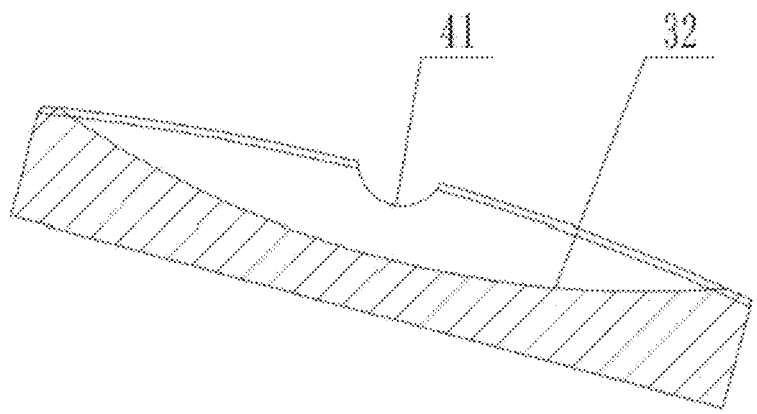
FIG. 12 is an elevational view, partly in section, of the single oil pocket and the end-to-end-connecting oil feed groove of a wind turbine planet gear shaft according to the present disclosure.

As shown in FIG. 11, the single oil pocket 32 is a flat-bottomed rectangular oil pocket, and the oil discharge groove 41 is an arc-shaped oil discharge groove 41. In other embodiments, all structural forms of the single oil pocket 32 that are able to ensure a sufficient oil storage area of the single oil pocket 32 are considered to fall within the scope of protection of the present invention. As shown in FIGS. 2 and 12, the single oil pocket 32 may also be configured as a single oil pocket 32 with an arc-shaped bottom face. All structural forms of the oil discharge groove 41 that are able to ensure discharge of oil and oil impurities should be considered to fall within the scope of protection of the present invention; for example, the oil discharge groove could also be configured as an oil discharge groove that is V-shaped, square or trapezoidal, or in another form. Further, as shown in FIGS. 5 and 7, the oil supply channel 31 comprises a radial main oil feed segment 312, an axial oil supply segment 311 and a radial oil supply segment 314, which are sequentially in communication with each other. An oil feed end of the radial main oil feed segment 312 is located at an outer surface at an end of the shaft body 1, the axial oil supply segment 311 is located on a central axis of the shaft body 1, and the radial oil supply segment 314 is in communication with the single oil pocket 32. This structure is simple and compact, enabling external lubricating oil to be effectively delivered to the position of the radial sliding bearing 2, thus ensuring the lubricating and wear-reducing effect of the radial sliding bearing 2.

Figure 6:
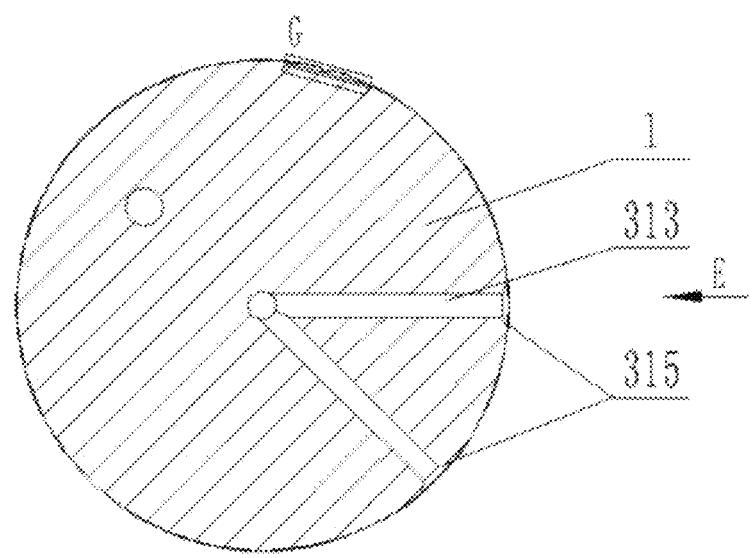
FIG. 6 is a sectional view along line B-B in FIG. 5.
Figure 9:
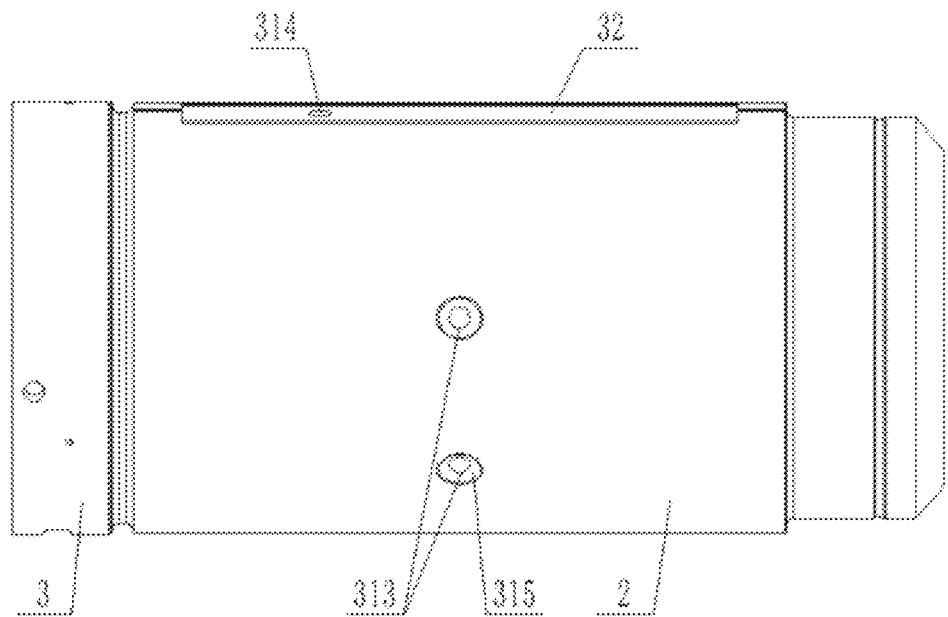
FIG. 9 is a structural schematic view of the wind turbine planet gear shaft of FIG. 6 looking in the direction of arrow E.

Further, as shown in FIGS. 6 and 9, the oil supply channel 31 further comprises a radial auxiliary oil feed segment 313. One end of the radial auxiliary oil feed segment 313 is disposed on the surface of the non-load-bearing zone 21 of the radial sliding bearing 2, and another end of the radial auxiliary oil feed segment 313 is in communication with the axial oil supply segment 311. The configuration of the radial auxiliary oil feed segment 313 increases the oil feed amount and oil circulation, further improving the cooling and heat-dissipating effect of the radial sliding bearing 2. At the same time, since the radial auxiliary oil feed segment 313 is disposed on the surface of the non-load-bearing zone 21 of the radial sliding bearing 2, the internal pressure distribution of the radial sliding bearing 2 will not be altered, further ensuring the operational reliability and safety of the structure of the wind turbine planet gear 6.

In this embodiment, the radial auxiliary oil feed segment 313 is located at a central position in a length direction of the radial sliding bearing 2, such that the load-bearing ability of the radial sliding bearing 2 is better; in other embodiments, the radial auxiliary oil feed segment 313 may also deviate from a central position on the radial sliding bearing 2, while ensuring effective bearing of the load of the planet gear 6.

In this embodiment, there are two radial auxiliary oil feed segments 313, the two radial auxiliary oil feed segments 313 being arranged in a circumferential direction of the shaft body 1; in other embodiments, the number of radial auxiliary oil feed segments 313 may be adjusted according to cooling requirements, e.g. may be set as one, three, four, etc.

Figure 8:
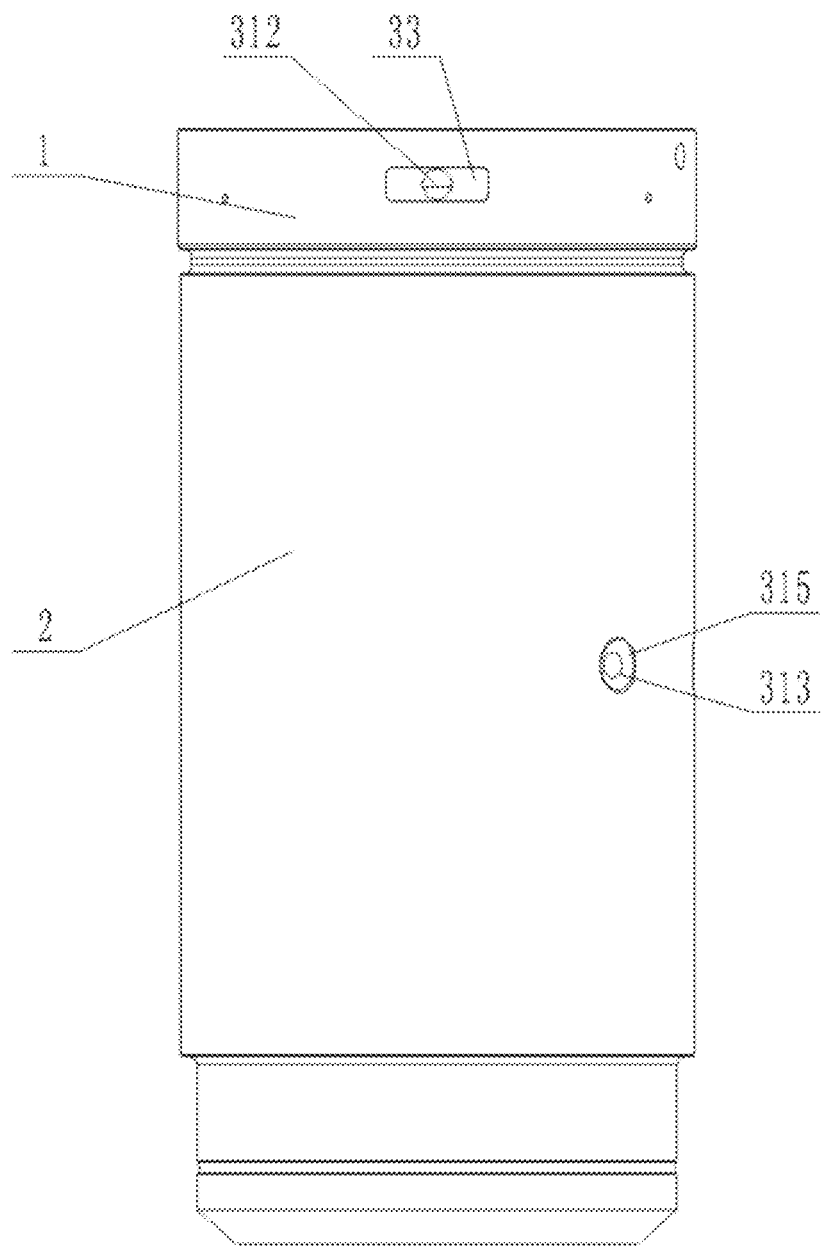
FIG. 8 is a elevation view of the wind turbine planet gear shaft of FIG. 4 looking in the direction of arrow D.

Further, as shown in FIGS. 8 and 9, a conical hole 315 is provided at an oil feed end of the radial auxiliary oil feed segment 313. The configuration of the conical hole 315 eliminates an obtuse angle at the oil feed end of the radial auxiliary oil feed segment 313, reducing the degree of damage after scraping of the radial sliding bearing 2 against the planet gear 6, and ensuring safe running of the planet gear 6. At the same time, the configuration of the conical hole 315 increases oil circulation and helps the radial sliding bearing 2 to form an oil film and to increase a load-bearing capacity.

As shown in FIG. 5, one end of the axial oil supply segment 311 is a blind end disposed inside the shaft body 1, and another end of the axial oil supply segment 311 is a threaded open end in communication with the outside, with a threaded plug 5 being screwed into the threaded open end. The configuration of the open end facilitates processing of the axial oil supply segment 311, while the threaded plug 5 can block the open end during running and thus prevent oil leakage.

In this embodiment, the oil discharge groove 41 is an arc-shaped oil discharge groove; this avoids stress concentration during oil delivery and enables impurities and particulates in the lubricating oil to be smoothly discharged through the oil discharge groove 41. In other embodiments, the form of the oil discharge groove 41 may be adjusted according to actual circumstances, e.g. it could also be configured as a trapezoidal oil discharge groove, a square oil discharge groove, etc.

Figure 10:
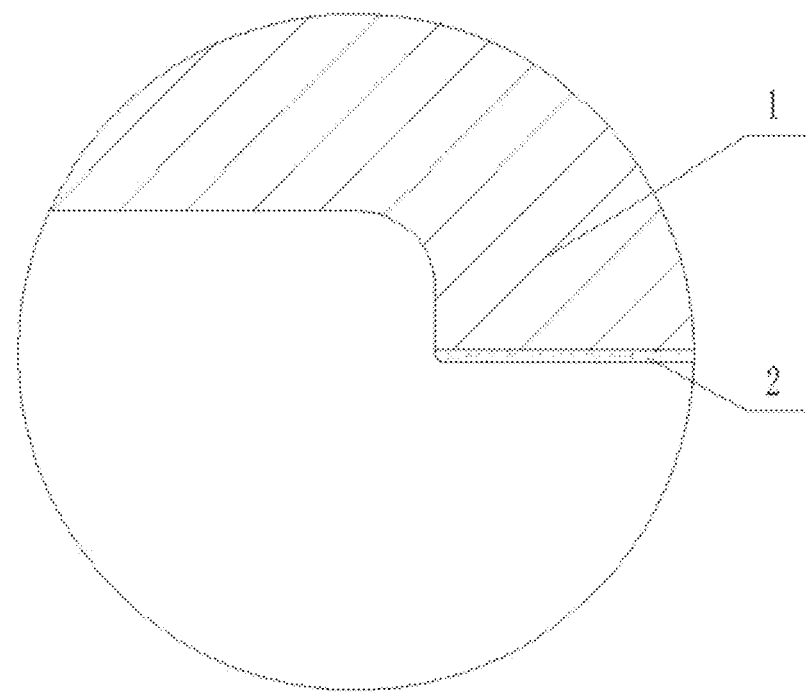
FIG. 10 is an enlarged detail view of region F in FIG. 5.

As shown in FIG. 10, the radial sliding bearing 2 is an alloy wear-resistant bearing, which is formed on the outer surface of the shaft body 1 by laser cladding. Laser cladding results in the shaft body 1 and the alloy wear-resistant bearing being a single piece and has high processing precision and is unlikely to cause deformation of the wear-resistant bearing. Moreover, the strength of bonding between the shaft body 1 and the alloy wear-resistant bearing is high, and the risk of the two parts rotating relative to each other is low, thus avoiding the risk of gearbox damage due to bearing failure. Moreover, the alloy wear-resistant bearing weighs only about 20% of the weight of a wear-resistant layer of a shaft sleeve structure and greatly reduces material costs. In this embodiment, the alloy wear-resistant bearing uses an alloy material such as copper alloy or aluminum alloy.

Figure 13:
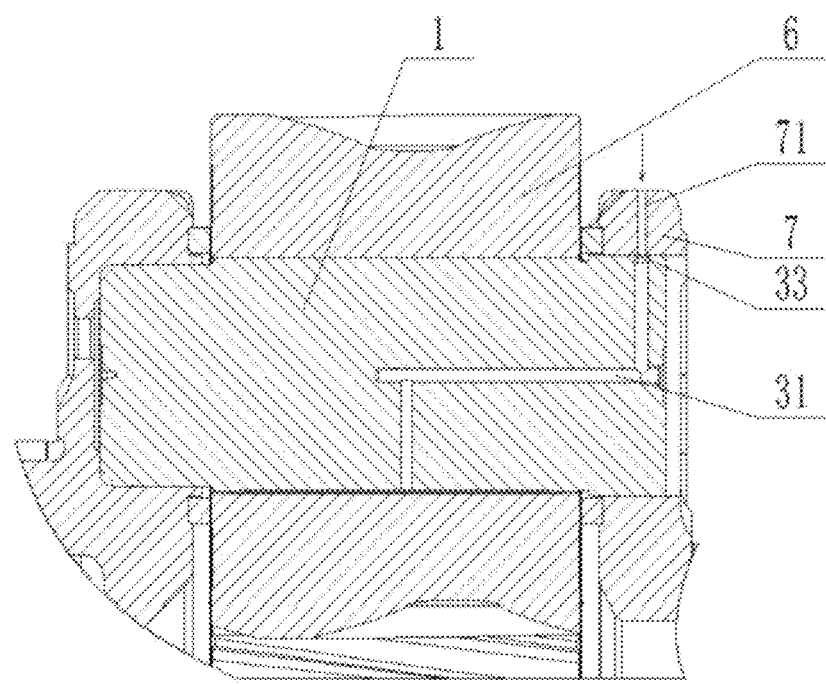
FIG. 13 is a main sectional view of the wind turbine planet gear structure according to the present disclosure.

As shown in FIG. 13, the wind turbine planet gear structure in this embodiment comprises a planet gear 6, a planet carrier 7 and the abovementioned wind turbine planet gear shaft. The planet gear 6 is fitted round the wind turbine planet gear shaft and rotates relative thereto, and the wind turbine planet gear shaft is fixedly mounted to the planet carrier 7. The wind turbine planet gear structure of the present invention also has the abovementioned advantages of the wind turbine planet gear shaft, and is structurally simple and compact.

Further, the planet carrier 7 is provided with an oil feed channel 71, the oil feed channel 71 being in communication with the oil supply channel 31. Moreover, an end-to-end-connecting oil feed groove 33 is provided at an end of the oil supply channel 31 which is in communication with the oil feed channel 71 such that the oil feed channel 71 and the oil supply channel 31 are in communication with each other via the end-to-end-connecting oil feed groove 33, thus avoiding a situation where end-to-end connection of the oil feed channel 71 and the oil supply channel 31 cannot be achieved due to installation error. This ensures that external oil is effectively delivered to the wind turbine planet gear shaft.

Although the present invention has been described with reference to preferred embodiments, various improvements could be made thereto and components therein could be replaced with equivalents without departing from the scope of the present invention. In particular, as long as there is no conflict in terms of structure, various technical features mentioned in various embodiments may be combined in any way. The present invention is not limited to the specific embodiments disclosed herein, but includes all technical solutions falling within the scope of the claims.

What is claimed is:

1. A wind turbine planet gear shaft, comprising:
   a shaft body having an outer surface, a segment of the shaft body outer surface comprising a slide bearing surface configured to form a radial slide bearing with an inner opening of a planet gear, the slide bearing surface having a first portion configured as a non-load-bearing zone and a second portion configured as a load-bearing zone,
   exactly one axially elongate oil pocket in the slide bearing surface, the oil pocket being located in the non-load-bearing zone,
   an oil supply channel in the shaft body having a first end in fluid communication with the oil pocket and a second end,
   a first oil return channel in the slide bearing surface having a first end at a first longitudinal end of the oil pocket and a second end open to ambient air, and
   a second oil return channel in the slide bearing surface having a first end at a second longitudinal end of the oil pocket and a second end open to the ambient air.

2. The wind turbine planet gear shaft according to claim 1,
   wherein the oil supply channel comprises a radial oil feed segment, a radial oil supply segment and an axial oil supply segment fluidly connecting the radial oil feed segment to the radial oil supply segment,
   wherein an inlet end of the radial oil feed segment is located at an outer radial surface at an end of the shaft body,
   wherein the axial oil supply segment is located on a central axis of the shaft body, and
   wherein the radial oil supply segment has an opening inside the oil pocket.

3. The wind turbine planet gear shaft according to claim 2,
   wherein the oil supply channel further comprises at least one radial auxiliary oil feed segment,
   wherein a first end of the at least one radial auxiliary oil feed segment is disposed at the first portion of the slide bearing surface, and wherein a second end of the at least one radial auxiliary oil feed segment is in fluid communication with the axial oil supply segment.

4. The wind turbine planet gear shaft according to claim 3,
   wherein the at least one radial auxiliary oil feed segment is located at a longitudinally central position of the sliding bearing surface.

5. The wind turbine planet gear shaft according to claim 4,
   wherein the at least one radial auxiliary oil feed segment comprises a first radial auxiliary oil feed segment and a second radial auxiliary oil feed segment, and
   wherein the first end of the first radial auxiliary oil feed segment is circumferentially spaced from the first end of the second radial auxiliary oil feed segment.

6. The wind turbine planet gear shaft according to claim 3,
   wherein the first end of the at least one radial auxiliary oil feed segment is conically tapered.

7. The wind turbine planet gear shaft according to claim 2,
   wherein the axial oil supply segment is a blind bore having a threaded open end open to the ambient air, and
   wherein the threaded open end is sealed by a threaded plug.

8. The wind turbine planet gear shaft according to claim 1,
   wherein the segment of the shaft body outer surface comprises a layer of laser-cladding on the outer surface of the shaft body.

9. The wind turbine planet gear shaft according to claim 1,
   wherein a radially inner surface of the oil pocket is planar.

10. The wind turbine planet gear shaft according to claim 1,
    wherein a radially inner surface of the oil pocket is concave.

11. The wind turbine planet gear shaft according to claim 1,
    wherein the second end of the oil supply channel is located in a circumferentially extending groove in the outer surface of the shaft body.

12. The wind turbine planet gear shaft according to claim 3,
    wherein the first end of the at least one radially auxiliary oil feed segment is circumferentially spaced from the oil pocket.

13. A wind turbine planet gear assembly, comprising:
    a planet carrier,
    a wind turbine planet gear shaft fixedly mounted to the planet carrier, and
    a planet gear mounted on the wind turbine planet gear shaft,
    wherein the wind turbine planet gear shaft includes:
      a shaft body having an outer surface, a segment of the shaft body outer surface comprising a slide bearing surface configured to form a radial slide bearing with an inner opening of a planet gear, the slide bearing surface having a first portion configured as a non-load-bearing zone and a second portion configured as a load-bearing zone,
      exactly one axially elongate oil pocket in the slide bearing surface, the oil pocket being located in the non-load-bearing zone, an oil supply channel in the shaft body having a first end in fluid communication with the oil pocket and a second end, a first oil return channel in the slide bearing surface having a first end at a first longitudinal end of the oil pocket and a second end open to ambient air, and a second oil return channel in the slide bearing surface having a first end at a second longitudinal end of the oil pocket and a second end open to the ambient air, wherein the second end of the oil supply channel is located in a circumferentially extending groove in the outer surface of the shaft body, and wherein the planet carrier includes an oil feed channel in fluid communication with the circumferentially extending groove.

14. The wind turbine planet gear assembly according to claim 13, wherein the oil supply channel comprises a radial oil feed segment, a radial oil supply segment and an axial oil supply segment fluidly connecting the radial oil feed segment to the radial oil supply segment, wherein an inlet end of the radial oil feed segment is located at an outer radial surface at an end of the shaft body, wherein the axial oil supply segment is located on a central axis of the shaft body, wherein the radial oil supply segment has an opening inside the oil pocket, wherein the oil supply channel further comprises at least one radial auxiliary oil feed segment, wherein a first end of the at least one radial auxiliary oil feed segment is disposed at the first portion of the slide bearing surface and circumferentially spaced from the oil pocket, and wherein a second end of the at least one radial auxiliary oil feed segment is in fluid communication with the axial oil supply segment.

\* \* \* \* \*